United States Patent
Marioni

(10) Patent No.: US 9,293,966 B2
(45) Date of Patent: Mar. 22, 2016

(54) STATOR ASSEMBLY WITH ALUMINUM WINDINGS, ELECTRIC MOTOR AND DISCHARGE PUMP FOR HOUSEHOLD APPLIANCES COMPRISING SAID STATOR ASSEMBLY

(71) Applicant: Askoll Holding S.r.l. a socio unico, Povolaro di Dueville (Vicenza) (IT)

(72) Inventor: Elio Marioni, Dueville (IT)

(73) Assignee: Askoll Holding S.r.l. a socio unico (IT)

( * ) Notice: Subject to any disclaimer, the term of this patent is extended or adjusted under 35 U.S.C. 154(b) by 235 days.

(21) Appl. No.: 14/132,961

(22) Filed: Dec. 18, 2013

(65) Prior Publication Data

US 2014/0217839 A1 Aug. 7, 2014

(30) Foreign Application Priority Data

Feb. 6, 2013 (CN) .......................... 2013 2 0068248

(51) Int. Cl.
| | | |
|---|---|---|
| *H02K 1/06* | (2006.01) | |
| *H02K 9/22* | (2006.01) | |
| *F04D 13/06* | (2006.01) | |
| *H02K 5/08* | (2006.01) | |
| *H02K 5/22* | (2006.01) | |
| *H02K 11/00* | (2006.01) | |
| *H02K 7/14* | (2006.01) | |

(52) U.S. Cl.
CPC ........ *H02K 9/22* (2013.01); *F04D 13/06* (2013.01); *F04D 13/0606* (2013.01); *H02K 5/08* (2013.01); *H02K 5/225* (2013.01); *H02K 11/0047* (2013.01); *H02K 7/14* (2013.01); *H02K 2205/09* (2013.01)

(58) Field of Classification Search
CPC .. H02K 9/22; H02K 11/0042; H02K 2205/09
USPC ............ 310/216.036, 216.037, 216.038, 158, 310/175, 269
See application file for complete search history.

(56) References Cited

U.S. PATENT DOCUMENTS

| 5,767,606 | A | * | 6/1998 | Bresolin ................ 310/216.038 |
|---|---|---|---|---|
| 6,326,879 | B1 | * | 12/2001 | Hangmann et al. .......... 337/381 |
| 7,038,570 | B2 | * | 5/2006 | McMichael et al. .......... 337/380 |
| 8,624,451 | B2 | * | 1/2014 | Shi et al. ......................... 310/43 |
| 8,629,585 | B2 | * | 1/2014 | Bradfield ........................ 310/52 |
| 2006/0038450 | A1 | * | 2/2006 | Matin et al. .................... 310/58 |

* cited by examiner

*Primary Examiner* — Hanh Nguyen

(74) *Attorney, Agent, or Firm* — Akerman LLP

(57) ABSTRACT

A stator assembly (1) comprising: a ferromagnetic stator core (2); at least two stator coils (3) of enameled aluminum wire wound around said stator core (2); and a heat-dissipating envelope (4; 61) surrounding said stator coils (3), the heat-dissipating envelope (4; 61) comprising one or more degassing holes (5) traversing the envelope so that the stator coils (3) are in communication with the external environment.

10 Claims, 9 Drawing Sheets

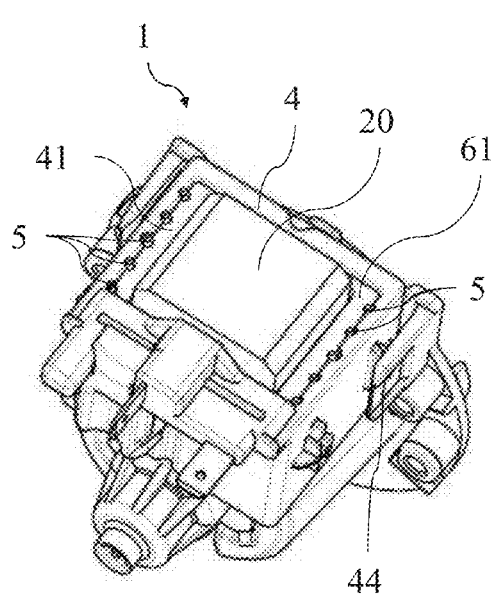
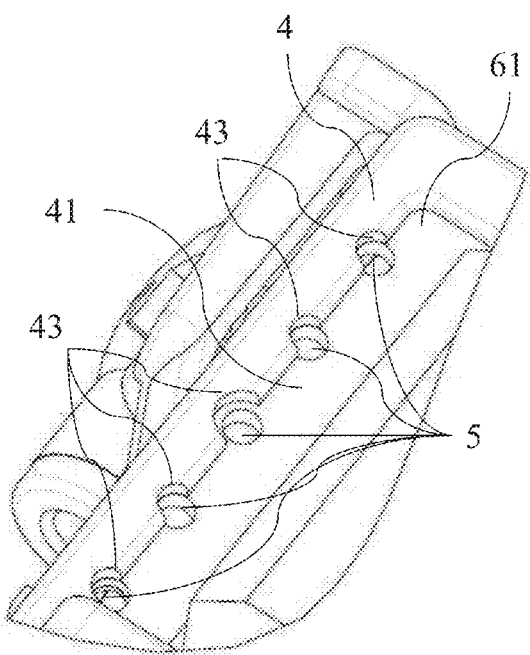
Fig. 3
Fig. 4

STATOR ASSEMBLY WITH ALUMINUM WINDINGS, ELECTRIC MOTOR AND DISCHARGE PUMP FOR HOUSEHOLD APPLIANCES COMPRISING SAID STATOR ASSEMBLY

FIELD OF APPLICATION

The present invention, in its most general aspect, refers to a stator assembly with aluminum windings.

The invention also refers to an electric motor, possibly integrated in a discharge pump, comprising the above-mentioned stator assembly and designed to be employed in a household appliance such as a washing machine or a dishwasher.

PRIOR ART

Electric motors are routinely employed within household appliances, like for instance washing machines or dishwashers.

A good example of such an application is represented by the discharge pump needed to evacuate the drain water at the end of each washing cycle.

The ongoing demand for price competitiveness in the inherent field of technology has resulted in the evolution of cost-effective electric motor pumps which are structurally simple yet reliable enough to fulfill their requirements. Single-phase permanent magnet synchronous motors are increasingly used, due to their excellent mass to power ratio and simple construction. These motors usually feature a U-shaped stator iron, the arms of which bear the copper windings of the motor.

However, even if the cost of the above-described devices is considerably lower with regard to other electric motors, there is still a need for a further reduction in material and manufacturing costs.

The relatively high and rapidly rising cost of copper has therefore suggested to substitute this material with aluminum in the manufacturing of the stator windings.

However, the technical disadvantages of aluminum windings in electric motor are well known in the field. Firstly, an aluminum winding will have to be bulkier compared to its copper counterpart, given the lower electric conductivity of the substitute material. Moreover, the aluminum winding will build up more heat during standard operation.

Therefore, an effective way of dissipating the heat has to be provided in stators equipped with aluminum windings. For instance, the prior art teaches to manufacture a heat dissipating envelope by injection molding of a plastic material around the windings.

However, the manufacturing method taught in the art still presents some drawbacks, mainly due to the risk of trapping gas bubbles within the stator core during the injection molding process. These bubbles will eventually damage the heat dissipating envelope thus greatly limiting its effectiveness.

Moreover, the heat dissipation provided by the envelope may prove in many cases insufficient, thus leading to a potentially hazardous overheating of the device.

SUMMARY OF THE INVENTION

The technical problem at the basis of the present invention is that of solving the drawbacks of the stator assembly with aluminum windings of the prior art, thus providing a device which is cost-effective and reliable for the use in a discharge pump for household appliances.

The above-mentioned technical problem is solved by a stator assembly comprising: a ferromagnetic stator core; at least two stator coils of enameled aluminum wire wound around said stator core; and a heat-dissipating envelope surrounding said stator coils; wherein said heat-dissipating envelope comprises one or more degassing holes traversing the envelope so that the stator coils are in communication with the external environment.

As a person skilled in the art will readily acknowledge, the provision of the degassing holes prevents the formation of gas bubbles during the injection molding process, while at the same time the heat-dissipating capability of the envelope is not hindered.

Moreover, a clever positioning of the degassing holes may help the operation of extracting the core with overmolded envelope from its mold after the injection molding process.

The stator core may typically have a U-shaped structure with two parallel arms connected together by a bridging portion, each arm having a free end defining a stator pole, each of the stator coils being wound on one of the two arms. In this case, the heat-dissipating envelope may advantageously cover both arms leaving their free ends and the bridging portion free.

The stator assembly may comprise two reels (preferably made of a self-extinguishing plastic material) fitted on the two arms of the U-shaped structure, said reels comprising a central core supporting the stator coils and side walls laterally retaining said stator coils. Said side walls may advantageously cooperate with an overmolding provided over the stator coils to form the heat-dissipating envelope.

The degassing holes may be provided on at least one of the side walls of the reels. In particular, the degassing holes may be provided at the external edge of the side walls, where said side walls meet with the overmolding. This may ease the extraction of the overmolded core from the mold after injection molding.

The heat-dissipating envelope has a front surface facing toward the stator poles and an opposite back surface. The degassing holes are preferably provided on said back surface.

The heat-dissipating envelope may be at least partly formed by an overmolding provided over the stator coils, the overmolding being preferably made of a thermosetting polymer.

In an embodiment of the present invention, the overmolding may be an outer surface featuring a plurality of projecting longitudinal fins, so as to enhance its heat-dissipation rate.

The stator assembly may further comprise a thermal protector component, said thermal protector component being arranged on an outer surface of the overmolding, a removable cap being fastened onto the outer surface for covering said thermal protector component.

Said stator coils may be connected with two electrical contact pins emerging from the overmolding, a removable sleeve being fastened onto the outer surface of said overmolding surrounding said electrical contact pins.

The above-mentioned technical problem is also solved by an electric motor comprising a stator assembly as previously described, further comprising a permanent magnet rotor embraced by the stator poles of the stator assembly.

The above-mentioned technical problem is also solved by a discharge pump for household appliances comprising an electric motor as previously described, further comprising an impeller solidly attached to the permanent magnet rotor.

Further characteristics and advantages of the invention will become clear from the following description of a number of specific embodiments given by way of non-limiting example, with reference to the enclosed drawings.

BRIEF DESCRIPTION OF THE DRAWINGS

FIG. 3 shows a perspective view of the stator assembly according to FIG. 1;

FIG. 4 shows an enlarged detail of the perspective view of FIG. 3;

DETAILED DESCRIPTION

Figure 1:
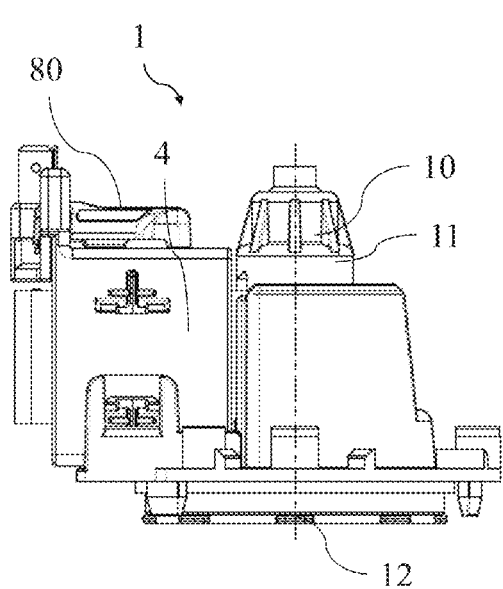
FIG. 1 shows a side view of a stator assembly according to the invention.
Figure 2:
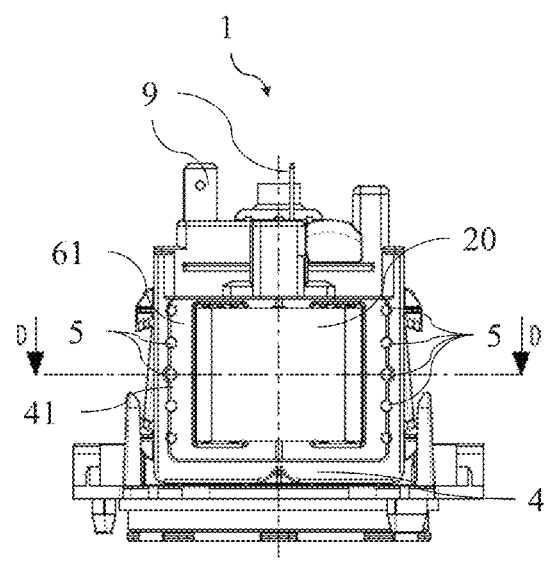
FIG. 2 shows a rear view of the stator assembly according to FIG. 1.

With reference to the above-described figures, the stator assembly according to the present invention is generally designated with reference number 1.

The stator assembly 1 is described in the following with particular reference to a first embodiment shown in FIGS. 1-5. However, the present description similarly applies to a second embodiment shown in FIGS. 6-11, together with its variants shown in FIGS. 12 and 13. Indeed, the second embodiments share the same functional features apart from some slight structural details that will be highlighted in a later part of the present description.

The stator assembly 1 comprises a rotor housing 10 which is known per se and manufactured out of a plastic material. Said rotor housing 10 features a cylindrical body 11 opening on an attachment flange 12.

The cylindrical body 11 internally defines a rotor chamber, wherein a permanent magnet rotor (not shown in the drawings) is rotatingly inserted. A pump casing (not shown in the drawings) is meant to be attached to the attachment flange 12. Within the pump casing an impeller, solidly attached to the permanent magnet rotor, is free to rotate in order to define a pumping action on a liquid.

The stator assembly 1, the pump casing and the permanent magnet rotor with the attached impeller form a discharge pump which may be employed in household appliances like washing machines and dishwashers.

The stator assembly further comprises a U-shaped ferromagnetic stator core 2, which may obtained in a known way out of a pack of stacked laminations.

The U-shaped structure of the stator core 2 features two parallel arms connected together by a bridging portion 20. Each arm has a free end 21 (only visible in the figures referring to the second embodiment) with a concave inner side defining a stator pole of the motor. The two stator poles embrace the cylindrical body 11 which is meant to house the permanent magnet rotor.

Two reels 6, conveniently made of a self-extinguishing plastic material, are slidingly inserted around the two arms of the U-shaped structure; each reel 6 supports a stator coil 3. The reels comprise a central core 60, around which the stator coil 3 is wound, and two side walls 61 laterally retaining said coils 3.

The two stator coils 3 are made of enameled aluminum wire.

An overmolding 4, made out of a thermosetting polymer is provided so as to cover the stator coils 3. The overmolding 4 defines a single box-shaped structure embracing both of the two arms leaving only their free ends 21 and the bridging portion 22 free.

The overmolding 4 mainly defines an outer sheath for the stator coils 3, adhering to the upper portions of said stator coils 3 which is not surrounded by the reels 6.

Figure 5:
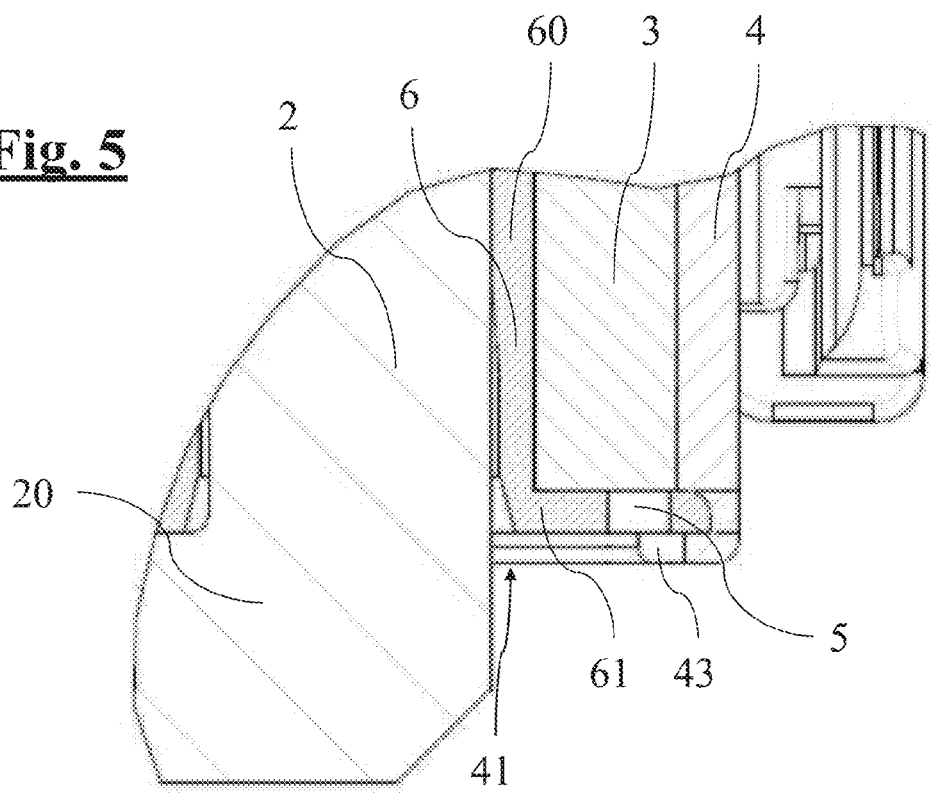
FIG. 5 shows a cross-sectional detail of the stator assembly taken along the sectional plane D-D shown in FIG. 2.
Figure 6:
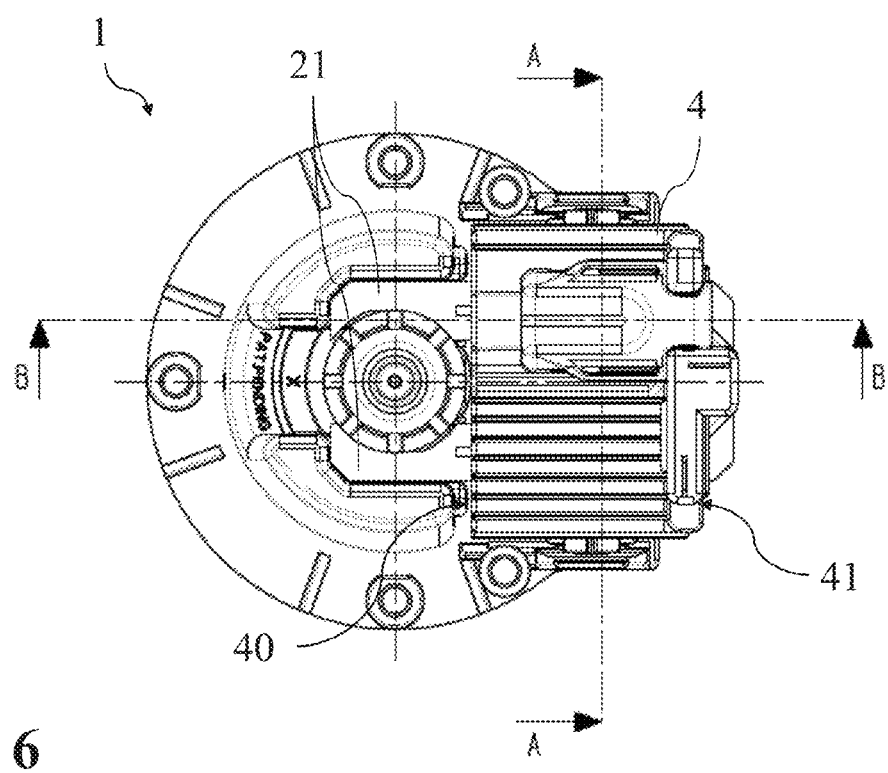
FIG. 6 shows a top view of an alternative embodiment of a stator assembly according to the present invention.
Figure 7:
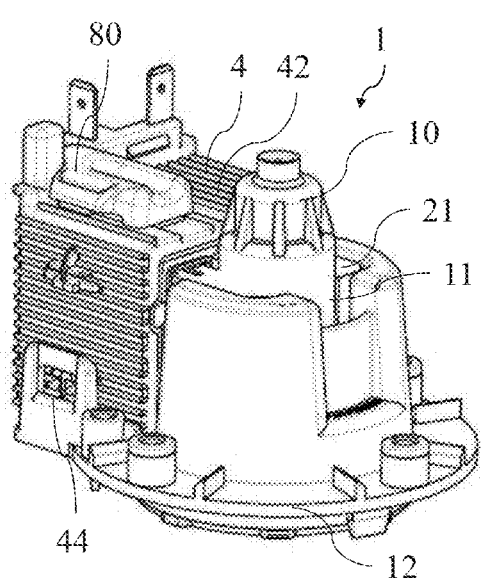
FIG. 7 shows a perspective view of the stator assembly according to FIG. 6.
Figure 8:
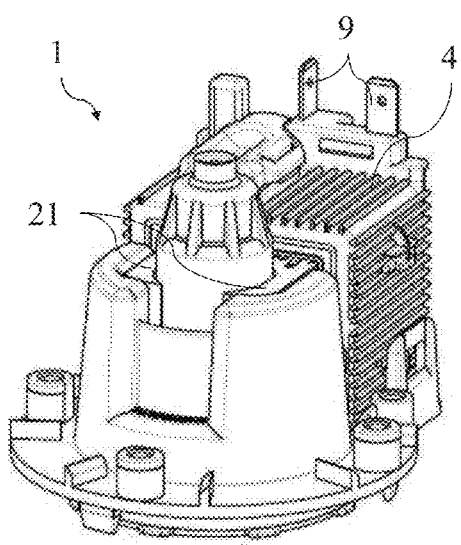
FIG. 8 shows a perspective view, taken under a different angle, of the stator assembly according to FIG. 6.
Figure 9:
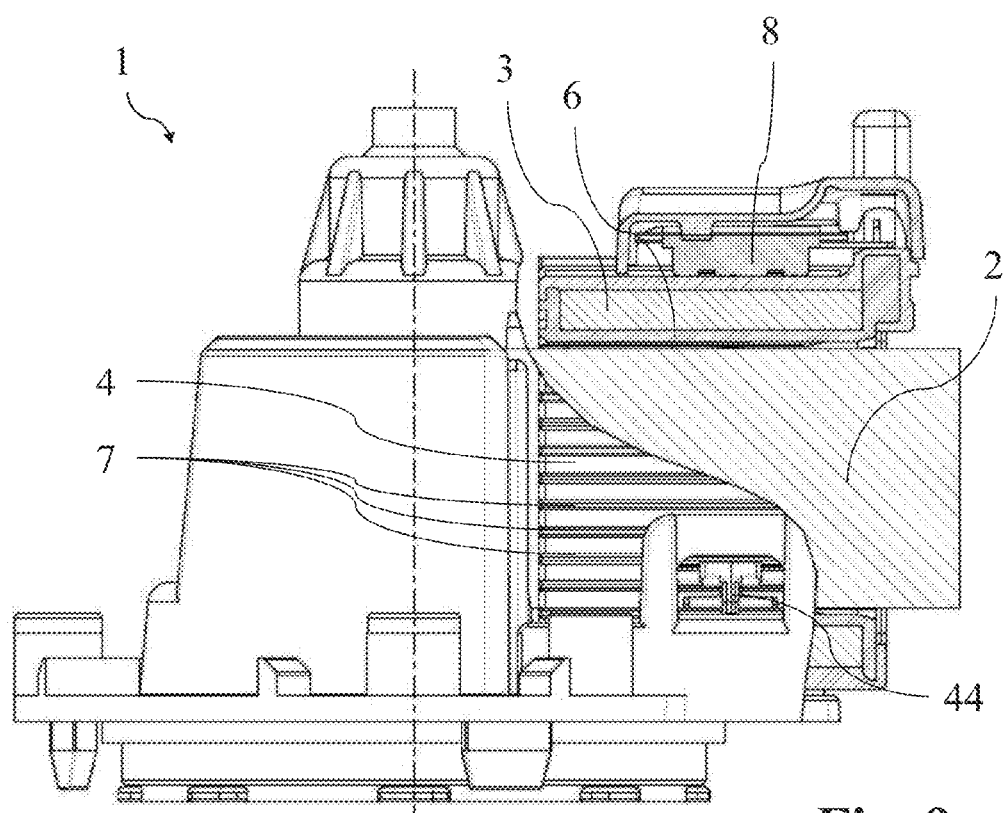
FIG. 9 shows a cross-sectional detail of the stator assembly taken along the sectional plane B-B shown in FIG. 6.
Figure 10:
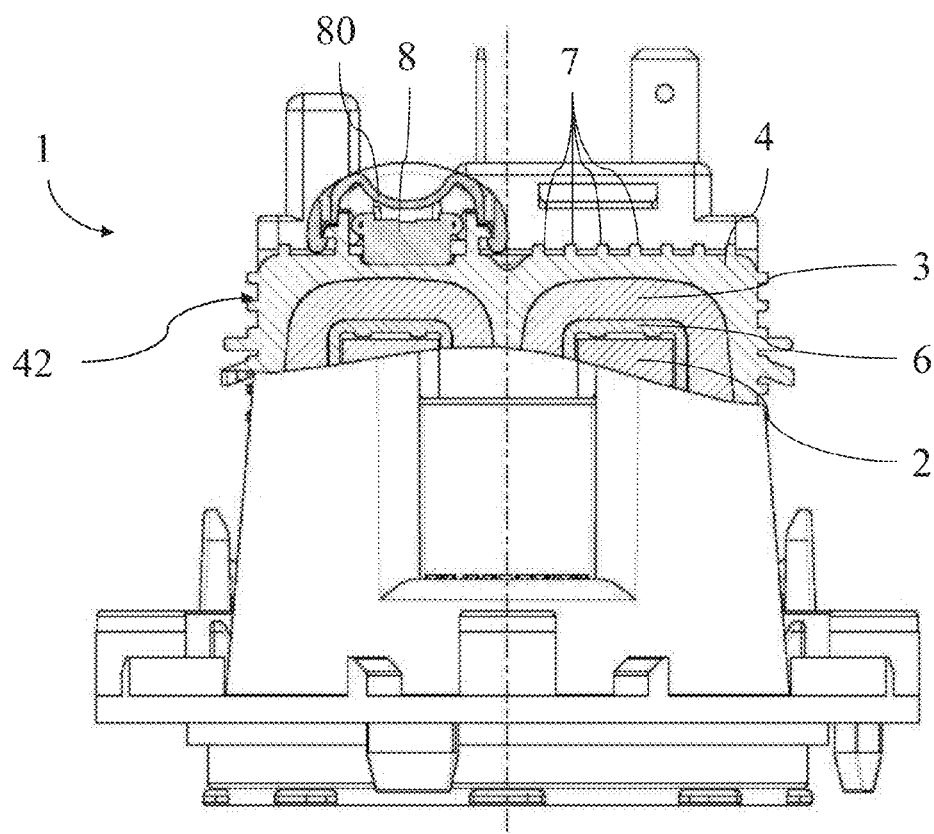
FIG. 10 shows a cross-sectional detail of the stator assembly taken along the sectional plane A-A shown in FIG. 6.

As may be seen in FIG. 5, the overmolding 4 reaches the outer perimeter of the side walls 61 of the reels 6. Therefore, the side walls cooperate with the overmolding 4 to form a heat-dissipating envelope 4; 61 enclosing the whole body of the stator coils 3.

Said heat-dissipating envelope 4; 61 has a front surface 40 facing toward the stator poles and an opposite back surface 41 facing toward the bridging portion 20 of the U-shaped stator core 2. An outer surface 42 of the overmolding connects the front 40 and back 41 surfaces.

The side walls 61 of the reels 6 are provided with a plurality of degassing holes 5 (not visible in the FIGS. 6-13 referring to the second embodiments) opening on the front surface of the heat-dissipating envelope. Said degassing holes 5 keep the stator coils 3 in contact with the outside environment.

The degassing holes 5 preferably have a diameter of about 2 mm, and they are arranged in two rows of five extending along the external edge of both side walls 62.

The corresponding edges of the overmolding 4 are also provided with arc-shaped apertures 43 aligned with the degassing holes 5. It should be noted that the described layout advantageously facilitates the extraction of the overmolded core from the mold upon manufacturing.

Fastening means 44 are provided on the outer surface 42 of the overmolding 4 for quick-coupling of the overmolded core with the attachment flange 12 of the rotor housing 10.

Two electrical contact pins 9 emerge from the overmolding 4 in order to allow the connection of the pump to a power supply.

A thermal protector component 8 (not visible in FIGS. 1-5 referring to the first embodiment) is provided on the stator assembly 1 to avoid overheating of the discharge pump. The thermal protector component 8 is arranged on the outer surface 42 of the overmolding 4.

A removable cap 80, 80', which is releasably fastened onto the outer surface 42 covers and conceals the thermal protector component 8.

Figure 11:
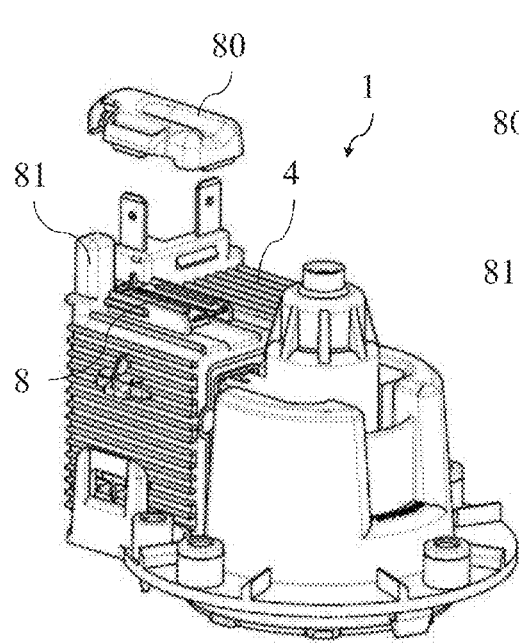
FIG. 11 shows a perspective view of the stator assembly according to FIG. 6 with the covering cap of a thermal protector component removed.
Figure 12:
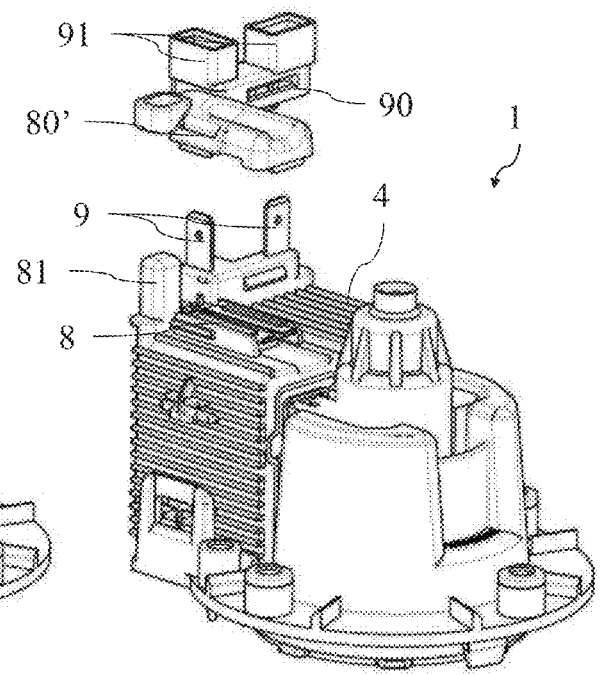
FIG. 12 shows a perspective view of a variant of the stator assembly of FIG. 11, wherein the covering cap of the thermal protector component is modified and a covering sleeve for the electrical contact pins is provided.

FIGS. 11 and 12 show two alternative embodiments of the removable cap 80, 80'. In the first embodiment, the removable cap 80 has a lateral aperture meant to accommodate a projection 81 of the overmolding; in the second embodiment 80', said lateral aperture is substituted by a ring-like feature embracing the projection 81.

Figure 13:
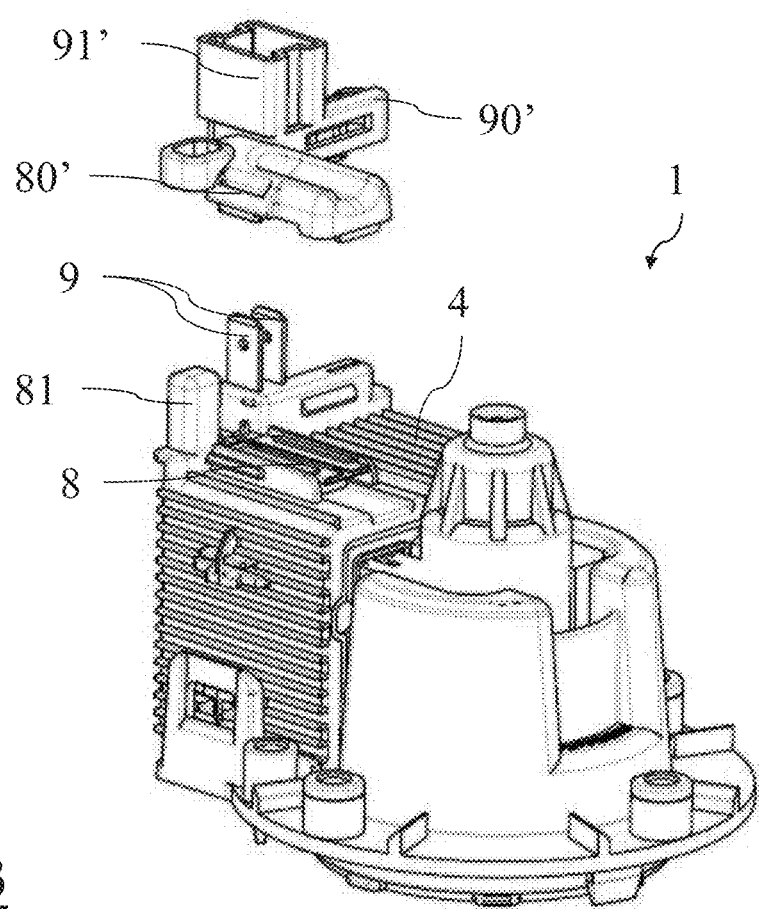
FIG. 13 shows a perspective view of a variant of the stator assembly of FIG. 12, wherein the arrangement of the electrical contact pins and of their covering sleeve is modified.

FIGS. 12 and 13 show two alternative embodiments of a removable sleeve 90, 90', releasably fastened onto the outer surface 42 of the overmolding 4, meant to surround and protect the electrical contact pins 9 in order to prevent corrosion. In the first embodiment, the removable sleeve 90 has two separate hoses 91 meant to accommodate the two electric contact pins 9. In the second embodiment, the two electric contact pins 9 are designed adjacent to each other and the removable sleeve 90 comprises a single hose covering them both.

In the alternative embodiments shown in FIGS. 6-13, the outer surface 42 of the overmolding 4 features a plurality of projecting longitudinal fins 7 on three sides, so as to enhance the heat-dissipating capability of the heat-dissipating envelope 4; 61.

Obviously a person skilled in the art can apply numerous modifications and variations to the devices described above to meet with specific and contingent needs; these would, nevertheless all fall within the scope of protection of the invention as described in the following claims.

The invention claimed is:

1. A stator assembly comprising:
a ferromagnetic stator core;
at least two stator coils of enameled aluminum wire wound around said stator core; and a heat-dissipating envelope surrounding said stator coils;
wherein said heat-dissipating envelope comprises one or more degassing holes traversing the envelope so that the stator coils are in communication with the external environment;
wherein the stator core has a U-shaped structure with two parallel arms connected together by a bridging portion, each arm having a free end defining a stator pole, each of the stator coils being wound on one of the two arms, the heat-dissipating envelope covering both arms leaving their free ends and the bridging portion free;
comprising two reels fitted on the two arms of the U-shaped structure, said reels comprising a central core supporting the stator coils and side walls laterally retaining said stator coils, said side walls cooperating with an overmolding provided over the stator coils to form the heat-dissipating envelope; and
wherein said degassing holes are provided on at least one of the side walls of the reels.

2. The stator assembly according to claim 1, wherein said reels are made of a self-extinguishing plastic material.

3. A stator assembly comprising:
a ferromagnetic stator core;
at least two stator coils of enameled aluminum wire wound around said stator core; and a heat-dissipating envelope surrounding said stator coils;
wherein said heat-dissipating envelope comprises one or more degassing holes traversing the envelope so that the stator coils are in communication with the external environment; and
wherein said heat-dissipating envelope has a front surface facing toward the stator poles and an opposite back surface, the degassing holes being provided on said back surface.

4. The stator assembly according to claim 3, wherein said heat-dissipating envelope is at least partly formed by an overmolding provided over the stator coils.

5. The stator assembly according to claim 3, wherein said overmolding is made of a thermosetting polymer.

6. The stator assembly according to claim 3, wherein the overmolding has an outer surface featuring a plurality of projecting longitudinal fins.

7. The stator assembly according to claim 3, further comprising a thermal protector component, said thermal protector component being arranged on an outer surface of the overmolding, a removable cap being fastened onto the outer surface for covering said thermal protector component.

8. The stator assembly according to claim 3, wherein said stator coils are connected with two electrical contact pins emerging from the overmolding, a removable sleeve being fastened onto the outer surface of said overmolding surrounding said electrical contact pins.

9. The electric motor comprising a stator assembly according to claim 3, further comprising a permanent magnet rotor embraced by stator poles of the stator assembly.

10. The discharge pump for household appliances comprising an electric motor according to claim 9, further comprising an impeller solidly attached to the permanent magnet rotor.

* * * * *